United States Patent Office 3,794,693
Patented Feb. 26, 1974

3,794,693
MODIFIED POLYARYLENE POLYETHER
RESIN COMPOSITIONS
Robert L. Lauchlan, Granger, Ind., and Hugh E. Snodgrass, Arcadia, Calif., assignors to Uniroyal, Inc., New York, N.Y.
No Drawing. Filed Mar. 16, 1972, Ser. No. 235,409
Int. Cl. C08g 43/02
U.S. Cl. 260—823    11 Claims

ABSTRACT OF THE DISCLOSURE

Blends of a polyarylene polyether resin with a poly-(epihalohydrin) provide thermoplastic compositions characterized by unique properties, particularly, an unusually useful combination of high impact strength, high tensile strength and high flexural moduli, and excellent flame resistance.

BACKGROUND OF THE INVENTION

1. Field of the invention

The present invention relates to polyarylene polyether resin compositions characterized by improved impact strength, and flame resistance. More particularly, the invention relates to the thermoplastic resin blend of a polyarylene polyether resin with a poly(epihalohydrin).

2. Description of the prior art

The polyarylene polyether resins are known and described in numerous publications including U.S. Pat. Nos. 3,264,536 and 3,423,479. The high molecular weight polymers are high performance engineering thermoplastics possessing relatively high softening points, i.e., in excess of 275° F. and excellent dimensional stability.

However, polyarylene polyether resin does not have sufficient impact strength, or flame resistance, to permit its use in applications where it might otherwise be advantageously employed.

STATEMENT OF THE INVENTION

The present invention relates to blends of high molecular weight polyarylene polyether resins with 2 to 25 percent (all percentages are expressed by weight herein) of poly(epihalohydrin)s which are characterized by substantially improved impact strength, and flame resistance. Of note is the fact that the incorporation of these chlorinated polyethers does not adversely affect the desirable properties of the polyarylene polyether resins, e.g., the high heat distortion temperature and mechanical strength properties of the resin.

Accordingly, the object of the present invention is to provide polyarylene polyether resin compositions having high impact strength and improved flame resistance which are capable of being formed into articles of manufacture such as thermoformable plastic sheet material.

DESCRIPTION OF THE INVENTION

The polyarylene polyether resins with which this invention is concerned are made up of repeating units which may be represented by the general formula:

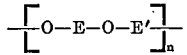

wherein E is the residuum of a dihydric phenol, E' is the residuum of a benzenoid compound having substituted thereon an inert electron withdrawing group, $n$ is a positive integer and is at least 15, and is preferably 20 or more, and where both of said residua are covalently bonded through oxygen ether atoms.

The dihydric phenol residuum (E) may be, for instance, a mononuclear phenylene group, or a di-, tri-, or polynuclear phenylene residuum. The dihydric phenol residuum may optionally be substituted with inert nuclear substituents, such as, for example: halogen, alkoxy, alkyl, etc.

It is preferred that the dihydric phenol, providing residuum E, be a weakly acidic dihydric di- or tri-nuclear phenol such as, for example the dihydroxydiphenyl alkanes, or dihydroxydiphenyl-p-dialkyl benzenes, or the nuclear halogenated derivatives thereof. Suitable dihydric phenols include, for example: 2,2-bis(4-hydroxy phenyl) propane, bis(4-hydroxyphenyl) methane, 1,1-bis(4-hydroxy phenyl)-2-phenyl ethane, α,α-bis(4-hydroxy phenyl)-p-diisopropylbenzene, α,α-bis(4-hydroxy phenyl)-p-xylene, etc. Suitable nuclear halogenated dihydric phenols include, for example: 2,2-bis(3,5-dichloro-4-hydroxyphenyl)propane, 2,2-bis(3,5-dibromo-4-hydroxyphenyl) propane, etc. Other suitable dihydric di-, tri-, or polynuclear phenols are those in which the phenol residua are joined through a heteroatom functional group, such as for example: oxygen ether (—O—), carbonyl (—CO—), sulfide (—S—), sulfone (—SO₂—), etc.

It is also contemplated that a mixture of two or more different dihydric phenols may be used to accomplish the same ends as above. Thus, when referred to above the E residuum in the polymer structure can actually be the same or different aromatic residua. As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residuum of the dihydric phenol and the residuum of the benzenoid compound bonded through aromatic ether oxygen atoms.

The benzenoid residuum (E') may be derived from any dihalobenzenoid compound, wherein the two halogen atoms are bonded to benzene rings having an electron withdrawing group in at least one of the positions ortho and para to the halogen group. Such dihalobenzenoid compounds may be either mononuclear, where the halogens are attached to the same benzenoid ring, or polynuclear, where the halogens are attached to different benzenoid rings, as long as there is the activating electron withdrawing group in the ortho or para position of that benzenoid nucleus. The more reactive halogens, chlorine and fluorine, are the preferred halogen substituents. The electron withdrawing group is preferably a strong activating group such as a sulfone (—SO₂—), ketone (—CO—), sulfoxide (—SO—), vinyl (—CH=CH—), or azo (—N=N—).

If desired, polymers may be made with mixtures of two or more dihalobenzenoid compounds each of which have the structure described in the preceding paragraph. Thus the E' residuum of the benzenoid compounds in the polymer structure may be the same or different. It is seen also that as used herein, the E' term defined as being the "residuum of the benzenoid compound" refers to the aromatic or benzenoid residue of the compound after the removal of the halogen atoms on the benzenoid nucleus.

From the foregoing, it is evident that preferred polyarylene polyether resins are those composed of recurring units having the formula:

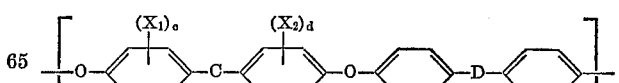

wherein C is a divalent connecting radical, D is a strong activating electron withdrawing group, and wherein $X_1$ and $X_2$ are inert nuclear halogen, alkyl, or alkoxy substituent groups, and where $c$ and $d$ are integers having a value of from 0 to 4 inclusive.

Even more preferred are the polyarylene polyether resins of the above formula wherein C is a divalent alkyl or divalent p-dialkyl-benzenoid group, D is a sulfone (—SO$_2$—) group, and c and d are zero.

Typical examples of polyarylene polyether resins and methods for making same are found in U.S. Pats. 3,264,-536; 3,423,479, and in New Linear Polymers, Chap. 5, by Lee et al., the text of which patents and reference are incorporated herein as a further description of the polyarylene polyether resins with which the present invention is concerned.

The epichlorohydrin polymers used in the present invention are concerned with polyethers containing halomethyl groups attached to the main polymer chain, as represented by the general formula

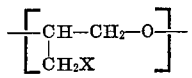

where X is halogen selected from the group consisting of bromine, chlorine, fluorine or iodine. Preferred epihalohydrin polymers include for example poly(epichlorohydrin). Alternatively, the epihalohydrin polymers may be copolymers comprising at least 50% epihalohydrin units, as described above, the remainder being one or more alkylene oxides such as ethylene oxide, propylene oxide, butene oxides, etc., butadiene monoxide, cyclohexene oxide, vinyl cyclohexene oxide, epoxyethers such as ethyl glycidyl ether, 2-chloroethyl glycidyl ether, hexyl glycidyl ether, allyl glycidyl ether and the like.

The epihalohydrin polymers useful in the production of the novel compositions of this invention are well known in the art and available commercially. A more detailed description of these epihalohydrin polymers is found in U.S. Pat. No. 3,026,270 to Anderson E. Robinson, Jr.

In the compositions of the present invention the poly(epihalohydrin) comprises from between about 2 and 25 percent of the blend, and more preferably between about 5 and 15 percent of the blend. Correspondingly, the polyarylene polyether resin constitutes at least 75 percent of the blend and more preferably between about 85 and 95 percent of the blend.

The method of blending the polyarylene polyether resin with the poly(epihalohydrin) is not critical, and does not constitute a part of this invention. Preferably the resin and chlorinated poly(epihalohydrin) ether are physically admixed by means of any mechanical mixing device conventionally used for mixing rubbers or platsics, such as an extruder, Banbury mixer, or differential roll mill. In order to facilitate thorough mixing of the polymers and to deveolp the desired improved combination of physical properties, the mechanical blending is carried out at sufficiently high temperatures to soften the polymers so that they are thoroughly dispersed and intermingled with each other.

Alternatively the resin and poly(epihalohydrin) may be solution blended by dissolving the polymers in a solvent such as dimethyl formamide and subsequently precipitating the polymer blend by adding the solution to a nonsolvent such as isopropanol, producing a homogeneous blend which is then dried by a suitable method. The blend can then be molded at a temperature above its softening point.

The mixtures of the invention may contain certain other additives to plasticize, lubricate, dye, pigment, prevent oxidation of, etc., the resin blends. Such additives are well known in the art and may be incorporated without departing from the scope of the invention.

The advantage which results from this invention is that it provides a new class of polyaryelne polyether resin mixtures characterized by a unique combination of physical properties. In particular, one may obtain thermoplastic compositions having substantially improved impact strength, and flame resistance. Of note is the fact that the incorporation of a poly(epihalohydrin) does not detrimentally affect the high heat distortion temperature or other mechanical strength properties of the polyarylene polyether resin. Of great importance in the present invention is the capability of providing a proper balance of properties in the blend to suit individual requirements or uses.

Further benefits obtained by blending a poly(epihalohydrin) with a polyarylene polyether resin are illustrated in the following examples which are set forth as a further description of the invention, but are not to be construed as limiting the invention thereto.

The test data included in the following examples was determined according to ASTM procedures:

Notched Izod Impact Strength—D256A–56
Flexural Modulus—D790–66
Tensile Strength—D638–64T
Heat Distortion Temperatures (at 264 p.s.i.)—D648–56
Flame Resistance—Federal Standard 191–5903

EXAMPLE I

A poly(epichlorohydrin) homopolymer was blended with a polyarylene polyether resin at the 5, 10, 15 and 20 percent by weight levels. The poly(epichlorohydrin) was designated Hydrin® –100 and was manufactured by the B. F. Goodrich Co. The poly(epichlorohydrin) was characterized by a specific gravity of 1.36 (20° C.) and a Mooney viscosity of 60 (ML4 at 100° C.). The particular polyarylene polyether was designated Bakelite Polysulfone® P–1700, manufactured by the Union Carbide Corp. and was the condensation polymer of 4,4'-dichlorodiphenyl sulfone and the sodium salt of Bisphenol A. The polyarylene polyether resin was characterized by a specific gravity of 1.24 (20° C.) and a melt flow index of 6.5 (gr./10 min.).

The blending operations were accomplished via a Banbury internal shear mixer. The poly(epichlorohydrin) and polyarylene polyether resin were mixed in a molten state at or above a temperature of 450° F. and at a mean shear rate of 300 sec$^{-1}$. A mixing time of about seven minutes was sufficient to obtain a homogeneous blend of the poly(epichlorohydrin) and the resin matrix. The blends were subsequently calendered into sheet material from which plaques were then compression molded at 350 p.s.i. at 500° F. Test specimens were machine cut from these plaques. Physical test data is summarized in Table I.

TABLE I.—COMPARISON OF RESIN AND POLYBLEND PROPERTIES

| | Percent by wt. poly-(epichlorohydrin) | Notched Izod impact strength (ft./lbs./in. notch) | Heat distortion temp., ° F. | Flexural modulus (p.s.i.) | Tensile strength (p.s.i.) | Flame-out time (sec.) |
|---|---|---|---|---|---|---|
| Control | None | 0.8 | 341 | 373,000 | 10,900 | 40 |
| Composition: | | | | | | |
| A | 5 | 1.0 | 340 | 384,000 | 11,500 | 4 |
| B | 10 | 9.7 | 337 | 303,000 | 8,700 | 5 |
| C | 15 | 7.1 | 329 | 298,000 | 8,100 | 5 |
| D | 20 | 4.0 | 301 | 252,000 | 6,800 | 5 |

As shown in Table I, the addition of a poly(epichlorohydrin) significantly improves the impact strength of the polyarylene polyether resin. As indicated by the flameout times recorded, the compositions of this invention exhibit much improved flame resistance when compared to the unmodified polyarylene polyether resin. Note that the incorporation of the poly(epichlorohydrin) does not detrimentally affect the high heat distortion temperature or other mechanical strength properties of the polyarylene polyether resin.

EXAMPLE II

A poly(epichlorohydrin-co-ethylene oxide) copolymer was blended with a polyarylene polyether resin at the 5, 10, 15 and 20% by weight levels. This particular chlorinated polyether was designated Hydrin®-200 and was manufactured by the B. F. Goodrich Co. The poly(epichlorohydrin-co-ethylene oxide) copolymer was characterized by a specific gravity of 1.27 (20° C.) and a Mooney viscosity of 100 (ML4 at 100° C.). The polyarylene polyether resin was that described in Example I.

The blending operations were accomplished via a Banbury internal shear mixer. The epichlorohydrin copolymer and polyarylene polyether resin were mixed in a molten state or or above a temperature of 450° F. and at a mean shear rate of 300 sec$^{-1}$. A mixing time of about seven minutes was sufficient to obtain homogeneous blend of the epichlorohydrin copolymer and resin matrix. The blends were subsequently calendered into sheet material from which plaques were then compression molded at 350 p.s.i. at 500° F.

Test specimens were machine cut from these plaques. Physical test data is summarized in Table II.

TABLE II.—COMPARISON OF RESIN AND POLYBLEND PROPERTIES

| | Percent by wt. poly(epichlorohydrin) | Notched Izod impact strength (ft./lbs./in. notch) | Heat distortion temp., ° F. | Flexural modulus (p.s.i.) | Tensile strength (p.s.i.) | Flameout time (sec.) |
|---|---|---|---|---|---|---|
| Control PSO-P1700 | None | 0.8 | 341 | 373,000 | 10,900 | 40 |
| Composition: | | | | | | |
| I | 5 | 1.2 | 339 | 390,000 | 11,000 | 14 |
| J | 10 | 8.5 | 331 | 319,000 | 8,400 | 13 |
| K | 15 | 7.6 | 323 | 282,000 | 6,400 | 10 |
| L | 20 | 3.3 | 287 | 254,000 | 5,200 | 5 |

As shown in Table II, the addition of poly(epichlorohydrin-co-ethylene oxide) copolymer significantly improves the impact strength of the polyarylene polyether resin. As indicated by the flameout times, the compositions of this invention exhibit much improved flame resistance when compared to the unmodified polyarylene polyether resin. Note that the incorporation of the chlorinated polyether does not detrimentally affect the high heat distortion temperature or other mechanical strength properties of the polyarylene polyether resin.

EXAMPLE III

A blend of polyarylene polyether resin was 2.5% poly(epichlorohydrin) and 2.5% poly(epichlorohydrin-co-ethylene oxide), the epichlorohydrin polymers described in Examples I and II respectively, was compounded and fabricated by procedures similar to those previously described. This composition had an impact strength of 5.6 ft. lbs./in. notch and a flameout time of 7 sec., and this was a significant improvement compared to the unmodified polyarylene polyether resin.

EXAMPLE IV

A blend of polyarylene polyether resin with 5% poly(epichlorohydrin) and 5% poly(epichlorohydrin-co-ethylene oxide), the epichlorohydrin polymers described in Examples I and II respectively, was compounded and fabricated by procedures similar to those previously described. This composition had an impact strength of 3.5 ft. lbs./in notch and a flameout time of 5 sec., and thus was a significant improvement compared to the unmodified polyarylene polyether resin.

Because of their unique combination of physical properties and excellent flame resistant properties, the polymer blends of this invention have many and varied uses. For example, they can be used in molding powder formulations either alone or mixed with various fillers such as wood, flour, diatomaceous earth, carbon black, silica, etc., to make molded parts such as gears, bearings, and cams, especially for applications where high impact strength and flame resistance is required. They can be used to prepare molded, calendered, or extruded articles and can be applied to a broad spectrum of uses in the form of sheets, rods, tapes, etc. The compositions may also be mixed with various modifying agents such as dyes, pigments, stabilizers, plasticizers, curatives, etc.

Obviously, other modifications and variations of the present invention are possible in light of the above disclosures. It is, therefore, to be understood that changes may be made in the particular embodiments of the invention described which are within the full intended scope of the invention as defined in the appended claims.

What is claimed is:

1. A thermoplastic resin composition comprising:
   (A) between about 75 and 98 percent (by weight) of a linear thermoplastic polyarylene polyether polysulfone resin composed of recurring units having the formula

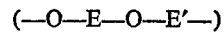

wherein E is the residuum of a dihydric phenol and E' is the residuum of a benzenoid compound having an inert electron withdrawing group in at least one of the positions ortho and para to the valence bonds, where both of said residua are valently bonded to the ether oxygens through aromatic carbon atoms, and at least one of E and E' provide a sulfone linkage between aromatic carbon atoms, and (B) corresponding between about 2 and 25 percent of an elastomer selected from the group consisting of poly(epihalohydrin) and copolymers containing at least 50% epihalohydrin units with at least one other vicinal monoepoxide, the repeating epihalohydrin units in said elastomer having the formula

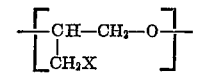

whereas X is a halogen selected from the group consisting of bromine, fluorine, chlorine and iodine, said epihalohydrin units in the case of a copolymer being joined to the copolymerized vicinal monoepoxide through the oxygen of the epoxide ring of said vicinal monoepoxide.

2. The composition of claim 1 in which at least 10% of the linkages between the arylene groups in said thermoplastic polyarylene polyether polysulfone resin are sulfone groups.

3. The composition of claim 1 in which said thermoplastic polyarylene polyether polysulfone resin containse alkylidene linkages between arylene groups.

4. A composition as in claim 1 wherein said thermoplastic poylarylene polyether polysulfone resin is composed of recurring units having the formula

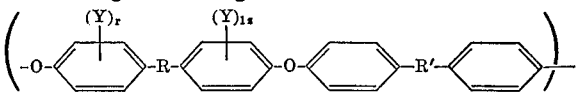

wherein R represents a member of the group consisting of a bond between aromatic carbon atoms and a divalent connecting radical and R' represents sulfone, Y and $Y_1$ each represent inert substituent groups selected from the group consisting of halogen, alkyl groups having from 1 to 4 carbon atoms and alkoxy groups having from 1 to 4 carbon atoms and where $r$ and $z$ are integers having a value from 0 to 4 inclusive.

5. A composition as in claim 1 wherein said thermoplastic polyarylene polyether polysulfone resin is composed of recurring units of the formula:

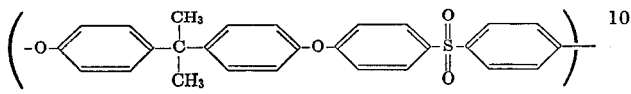

6. A composition as in claim 1 wherein said thermoplastic polyarylene polyether polysulfone resin is composed of recurring units having the formula

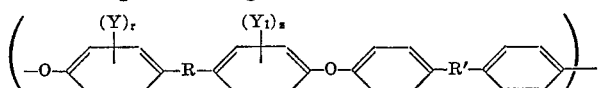

wherein R represents a member of the group consisting of a bond between aromatic carbon atoms and a divalent connecting radical and R' represents sulfone, Y and $Y_1$ each represent inert substituent groups selected from the group consisting of halogen, alkyl groups having from 1 to 4 carbon atoms and alkoxy groups having from 1 to 4 carbon atoms, and where $r$ and $z$ are integers having a value from 0 to 4 inclusive, and (B) is an elastomer selected from the group consisting of poly(epihalohydrin) and copolymers containing at least 50% epihalohydrin units with at least one other vicinal monoepoxide, the repeating epihalohydrin units in said elastomer having the formula

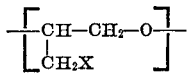

where X is a halogen selected from the group consisting of bromine, fluorine, chlorine and iodine, said epihalohydrin units in the case of a copolymer being joined to the copolymerized vicinal monoepoxide through the oxygen of the epoxide ring of said vicinal monoepoxide.

7. The composition as in claim 6 wherein (A) is composed of between about 80% and 95% by weight of recurring units of the formula:

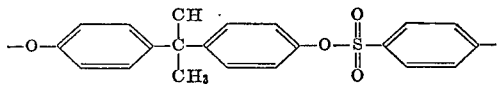

8. The composition of claim 7 in which (B) is poly (epihalohydrin).

9. The composition of claim 7 in which (B) is a copolymer of an epihalohydrin and at least one other vicinal monoepoxide.

10. The composition of claim 7 in which (B) is poly-(epichlorihydrin).

11. The composition of claim 7 in which (B) is a copolymer of epichlorohydrin and ethylene oxide.

References Cited
UNITED STATES PATENTS

| | | | |
|---|---|---|---|
| 3,158,580 | 11/1964 | Vandenberg | 260—823 |
| 3,158,581 | 11/1964 | Vanderberg | 260—823 |
| 3,629,170 | 12/1971 | Yamanouchi et al. | 260—823 |
| 3,375,297 | 3/1968 | Barth et al. | 260—823 |
| 3,631,126 | 12/1971 | Snodgrass et al. | 260—823 |

WILBERT J. BRIGGS, SR., Primary Examiner

U.S. Cl. X.R.

260—2 A, 47 EP, 79.3 A